March 19, 1946.  J. E. WALSTROM  2,396,935
ACOUSTIC LOGGING
Filed Nov. 5, 1942  4 Sheets-Sheet 1
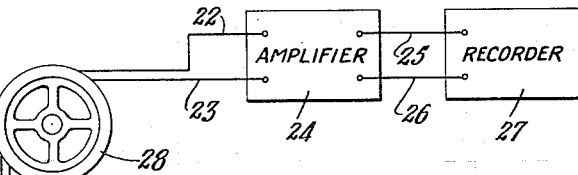
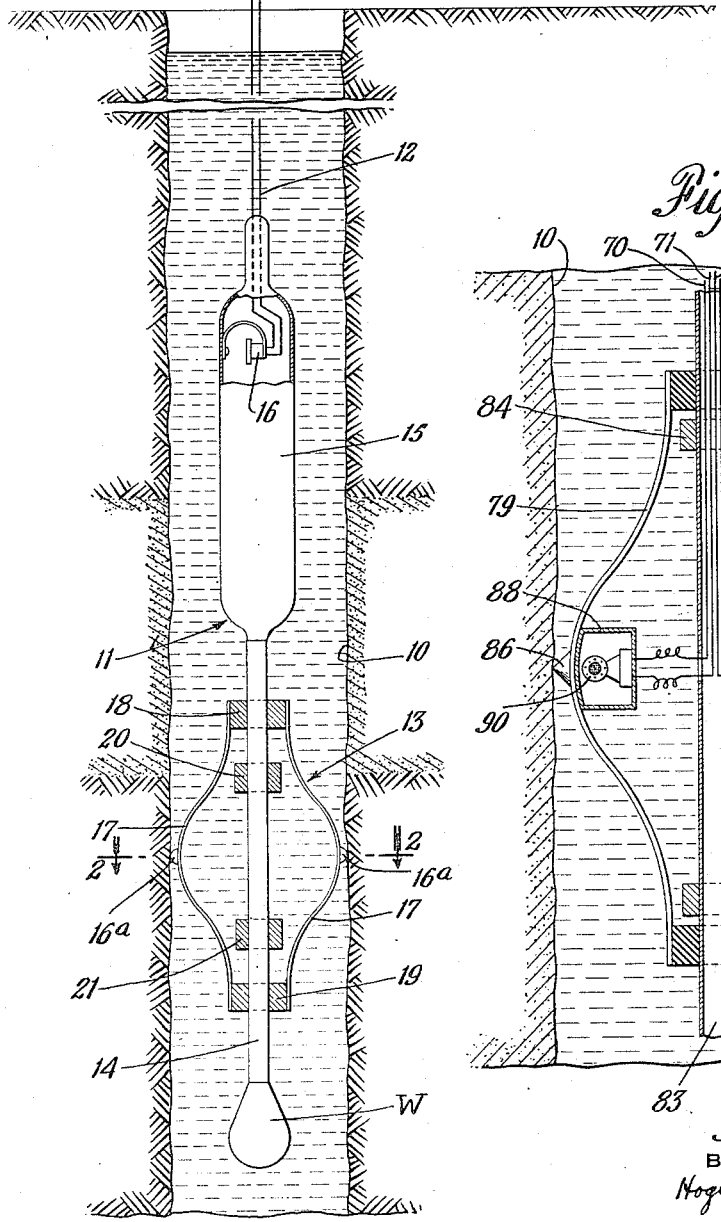
INVENTOR
JOHN E. WALSTROM
BY
Hoguet, Neary & Campbell
ATTORNEYS

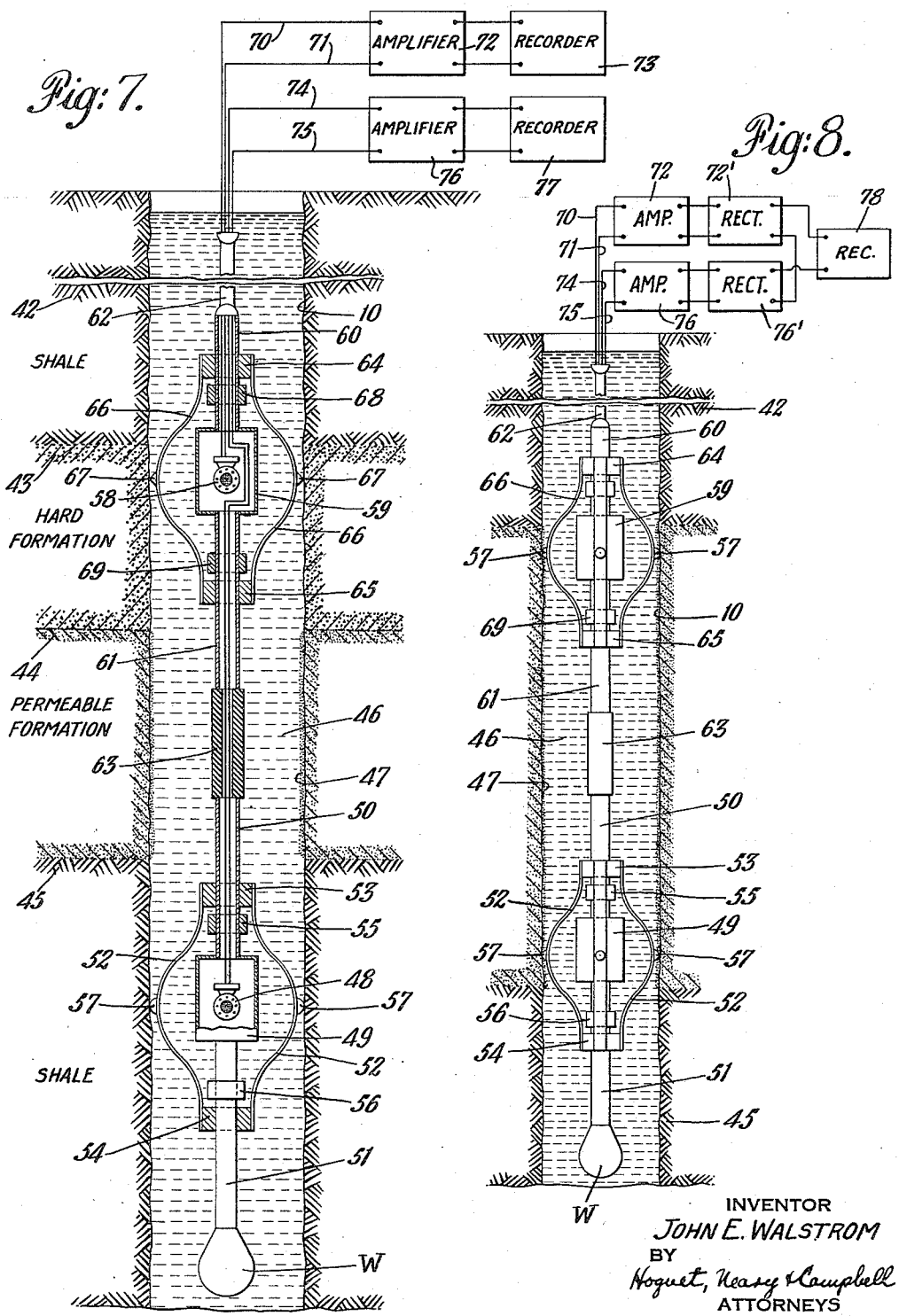

Patented Mar. 19, 1946

2,396,935

UNITED STATES PATENT OFFICE 2,396,935

ACOUSTIC LOGGING

John E. Walstrom, Houston, Tex., assignor to Schlumberger Well Surveying Corporation, Houston, Tex., a corporation of Delaware Application November 5, 1942, Serial No. 464,693

6 Claims. (Cl. 181—0.5)

The present invention relates to the investigation of subsurface earth strata and more particularly to a novel method and apparatus utilizing mechanical vibrations for obtaining useful information about subsurface earth strata traversed by a bore hole.

It is well known that the subsurface of the earth is stratified into layers of different physical properties and fluid contents. For example, in an oil field, the subsurface traversed by a bore hole usually comprises a plurality of superimposed formations including principally oil and water sands, shales, and limestones. Oil and water sands are relatively permeable and are generally fairly hard and rather coarse in texture. Limestones are relatively impermeable and generally considerably harder than permeable formations, while the shales are usually relatively soft and smooth in texture.

The invention resides, in part, in the discovery that when a relatively rigid member is moved through a bore hole, while in contact with the formation comprising the wall thereof, mechanical vibrations are set up which differ in character for the different types of formations encountered. In particular, it has been found that the intensity and the frequency of the vibrations differ for different types of formations, depending upon their nature and physical properties.

It is an object of the invention, accordingly, to provide a novel method and apparatus for obtaining information about the respective subsurface formations traversed by a bore hole by obtaining indications related to an effect arising upon the application of a vibration producing stimulus to the formations.

A further object of the invention is to provide a novel method and apparatus for producing, in a bore hole, mechanical vibrations which are related to the physical properties of the formations traversed thereby.

Another object of the invention is to provide a novel method and apparatus for investigating the hardness and texture of subsurface earth formations traversed by a bore hole.

A further object of the invention is to provide a novel method and apparatus for determining the depths and thicknesses of subsurface earth formations traversed by a bore hole, by investigating the hardness and texture of the respective formations traversed by the bore hole at different depths.

Still another object of the invention is to provide a novel method for locating a water or oil flow into a bore hole by obtaining indications of mechanical vibrations at different depths in the bore hole.

A still further object of the invention is to provide a novel method and apparatus for locating the boundaries between subsurface formations by investigating their texture and hardness in situ in a bore hole drilled into the earth.

Another object of the invention is to provide a novel method and apparatus for furnishing a log from which the depths and thicknesses of the respective subsurface formations traversed by a bore hole may be ascertained.

Still another object of the invention is to provide a bore hole logging method and apparatus which are operative under any fluid conditions that may be encountered in a bore hole.

According to the invention, a relatively rigid member is moved through the bore hole while in contact with the formation comprising the wall of the bore hole. The rubbing of the rigid member against the formations produces mechanical vibrations whose intensity and frequency depend upon the physical properties of the respective formations encountered. The mechanical vibrations thus produced are picked up and translated into corresponding electrical values which are indicated or preferably recorded as a function of depth in the bore hole, thus providing a log from which the depths and thicknesses of the different formations may be determined.

Where a shaley "mud cake" has formed on the wall of the bore hole as a consequence of drilling operations, for example, means are provided in accordance with the invention for cutting through the cake, whereby the rigid member may be rubbed against the formations.

In a further embodiment of the invention, runs are made either successively or simultaneously in a bore hole with a rigid member which does not cut through the "mud cake" and also with a rigid member that does cut through the "mud cake." In this fashion, two logs are provided from which additional information about the formations may be ascertained.

The boundaries between the formations may also be located according to the invention by moving two spaced apart, rigid members through the bore hole in engagement with the wall of the bore hole and indicating or recording an electrical value related to a quantity proportional to the difference in intensity between the mechanical vibrations produced by the two rigid members.

By stopping the apparatus for picking up mechanical vibrations at different depths in the bore hole, or by moving it through the hole with the contact members removed, the depth where water or oil flows into the well can be located in accordance with the invention by noting the point on the indicator or log where the mechanical vibration produced by the fluid flow is a maximum.

Additional objects of the invention will appear from the following detailed description of several representative embodiments taken in conjunction with the accompanying drawings, in which:

Figure 1 is a schematic diagram of apparatus constructed according to the invention and disposed in operative position in a bore hole;

Figure 7 is a schematic diagram of a further embodiment of the invention in which two logs are made simultaneously under different conditions;

Figure 8 is a schematic diagram of differential type apparatus for locating the boundaries between the respective formations traversed by a bore hole; and Figure 9 illustrates schematically a modification of the apparatus shown in Figure 7.

Figure 2:
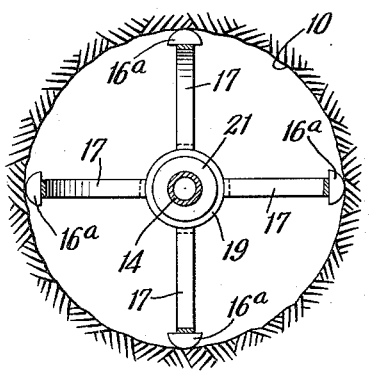
Figure 2 is a view in horizontal section taken along line 2—2 of Figure 1 and looking in the direction of the arrows.

Figure 1 shows a bore hole 10, which may or may not contain liquid, into which is introduced an assembly 11 adapted to be raised or lowered by an electric cable 12. The assembly 11 comprises essentially a contact member 13 for creating vibrational energy by rubbing along the wall of the bore hole 10, a rigid vibrational energy transmitting member 14 on which the contact member 13 is mounted, and a casing 15 containing a microphone 16 or other device sensitive to vibrational energy. The contact member 13 comprises a plurality of bow springs 17, four being shown in Figure 2, the upper and lower extremities of which are secured to collars 18 and 19, respectively, which are slidably mounted on the vibrational energy transmitting member 14. Secured to each bow spring 17 intermediate its ends is a button-shaped contact 16a which is adapted to be continually urged into engagement with the wall of the bore hole 10 by the inherent resiliency in the spring 17.

Also mounted on the vibrational energy transmitting member 14 are a pair of fixed stops 20 and 21 which serve to limit movement of the contact member 13 downwardly and upwardly, respectively, along the vibrational energy transmitting member 14. The stop 21 should preferably be located a sufficient distance from the casing 15 to prevent the contact member 13 from becoming jammed against the casing 15 when the assembly 11 is being lowered through a tight place in a bore hole. A weight W may be secured at the lower end of the vibrational energy transmitting member 14, if necessary, to facilitate lowering the assembly 11 into the bore hole 10.

The microphone 16 in the casing 15 is connected to two insulated conductors 22 and 23 in the supporting cable 12. The conductors 22 and 23 are connected at the surface of the earth to the input terminals of a conventional type amplifier 24, the output of which is supplied through the conductors 25 and 26 to a conventional type recorder 27, which is preferably driven from, or synchronized with, a sheave 28 over which the cable 12 passes. In this fashion, a continuous record with reference to depths may be obtained.

The type of recorder 27 selected will depend upon the type of record desired. If a permanent record of both intensity and frequency is wanted so that later reproduction and study can be made, a standard sound recorder can be used. On the other hand, if a record of the variation in intensity will suffice, a conventional alternating current meter type recorder can be employed.

The frequency range characteristics of the microphone 16 and the amplifier 24 should be suitably chosen to accommodate the range of frequencies present in the mechanical vibrations produced by the contact member 13. Also, the gain and power output of the amplifier 24 should be sufficient to actuate the recorder 27.

In operation, the assembly 11 is moved through the bore hole 10 at a desirable rate of speed. The passage of the button-shaped contacts 16a over the wall of the hole 10 results in the generation of vibrational energy. As the button-shaped contacts 16a pass formations of different texture and hardness, the intensity and nature of the vibrational energy generated will vary accordingly. Part of the vibrational energy thus generated is conducted to the microphone 16 in any desired fashion, such as, for example, through the bow springs 17, the vibrational energy transmitting member 14 and the casing 15. The electrical output of the microphone 16 is conducted to the surface, where it is amplified and recorded. The log thus obtained provides a continuous record of the vibrational energy, or of a selected characteristic thereof, generated by the passage of the button-shaped contacts 16a over the formations and which is related to the nature of the formations. The amplifier 24 may be omitted if the output of the microphone 16 is sufficient to actuate the recording instrument 27.

Figure 3:
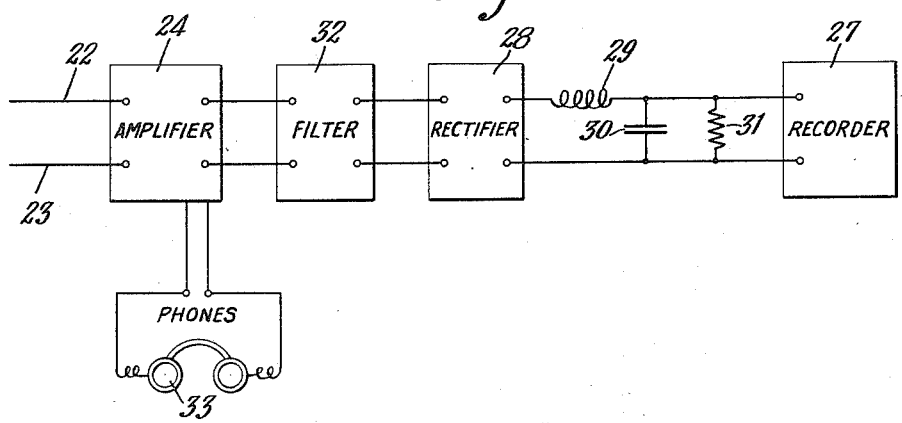
Figure 3 illustrates a modification of the surface equipment which utilizes a direct current recording instrument and enables aural indications to be obtained.

For recording intensity variations of the generated vibrational energy, a direct current recording instrument may be used instead of the alternating current type by inserting a rectifier 28 between the amplifier 24 and the recorder 27, as shown in Figure 3. If necessary, a smoothing circuit comprising a series inductance 29, a shunt condenser 30 and a shunt resistor 31, for example, can be inserted between the rectifier 28 and the recorder 27 to eliminate pulsations from the rectified current. If there is sufficient extraneous pickup in the cable 12 from alternating current power lines or other causes to interfere with the recording of the noise, a filter 32, designed to exclude the undesired frequencies, can be inserted between the amplifier 24 and the recording system to remove the interfering pickup. Aural observations can also be made by connecting conventional type headphones 33 at the output terminals of the amplifier 24, as shown in Figure 3.

As the components of the vibrational energy obtained depend largely upon the nature of the stimulating characteristics of the various formations, additional information can be obtained as to the character of the formations by determining the relative intensities of the components of the vibrational energy within certain frequency ranges. An observer can listen to the portion in the audible spectrum (noise) by connecting earphones 33 at the output of the amplifier, as shown in Figure 3, and check the operation as the survey progresses. However, it is desirable also to obtain observations that can readily be referred to at a later time. To this end, the vibrational energy can be recorded by one of the conventional sound recording methods, such as on phonograph records, so that later reproduction and analysis can be made by any desired method.

Figure 4:
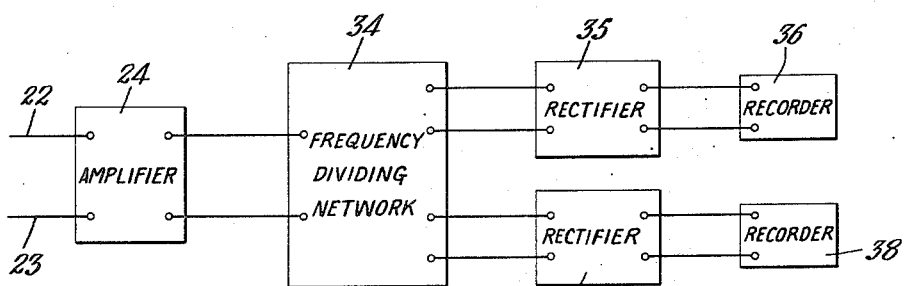
Figure 4 is a further modification of the surface equipment which enables a frequency analysis to be made of the mechanical vibrations produced in the bore hole.

By using an electric wave filter of the band pass type between the amplifier and the recorder, it is possible to record the intensity of the vibrational energy components in a given frequency band. Several different frequency bands can also be recorded simultaneously by using a suitable network to deliver energy in the various frequency bands to separate recorders. Figure 4 illustrates the use of two such recording channels. In this embodiment, the output of the amplifier 24 is conducted to a frequency dividing network 34, which separates the currents into two bands of frequencies. Each band is rectified and recorded separately, the rectifier 35 and the recorder 36 being used for one band and the rectifier 37 and the recorder 38 for the other. In this way, it is possible to obtain records of the nature of the composition of the vibrational energy which is related to the nature of the formations being traversed by the assembly 11. If desired, an alternating current recorder can be used instead of the rectifiers and direct current recorders shown.

A frequency analysis of the vibrational energy may also be made by means of an oscillograph, which may be used simultaneously with one of the other methods. In such case, indications are visual and photographic records of the wave form can be obtained.

In a dry hole or in a hole in which the wall comprises the actual formations, the depths and thicknesses of formations of different hardness and texture traversed by a bore hole can readily be determined. However, the permeable formations, which are of supreme interest in searching for oil or gas, generally cannot be located from the log obtained in a single run unless additional information is available. The reason for this is that both hard and permeable formations are hard and rough in texture and are therefore difficult to distinguish on the log.

It is also difficult to locate the permeable formations from the log obtained in a single run in a well containing drilling mud because the drilling mud normally employed comprises basically shale and water. If the hydrostatic pressure of the drilling mud in such a bore hole is greater than the formation pressure, as is usually the case, the liquid from the drilling mud will pass into the permeable formations, leaving a layer of shale, generally called the "cake," between such formations and the drilling mud. After a "cake" has been formed in this manner, it will be apparent that permeable formations, viewed from inside the bore hole, will not be distinguishable from shales. Hence, while the log obtained in a single run with a rubbing member of any type may be used for purposes of correlation between wells, it will not accurately locate the permeable zones in a single well.

However, the permeable formations may sometimes be indicated by a single run if suitable additional data is available. For example, the log obtained in a single run made according to the present invention in a dry hole or in a hole in which no shaley "cake" has been formed will denote both the hard formations and the permeable zones. Since the hard formations are ordinarily drilled at a much slower rate than the permeable zones, the permeable zones can be distinguished from the hard formations by comparing the log obtained with a record of the drilling speed. Also, after considerable experience in a given area, the permeable zones of interest may be identified by the characteristic shape or amplitude of the single curve obtained.

The permeable formations are accurately determined according to the present invention by making two runs, either successively or simultaneously, in one of which the rubbing member is adapted to cut through the "mud cake" and in the other of which it does not cut through the "cake." In the former run a large amplitude noise, or deflection on the record, will appear when the rubbing member engages the hard formations and also when it rubs over the sands or permeable formations. In the latter run only the hard formations exposed to the hole, i. e., the hard impermeable zones, will produce a large amplitude noise, or deflection on the record. The permeable zones will then be the difference between the two, that is, they are the zones which produced a large amplitude noise in the first run but not on the second.

The log for the run in which the rubbing member does not cut through the "mud cake" in a bore hole containing drilling mud can be obtained by the apparatus shown in Figure 1 and described above. A representative log obtained in this fashion is designated by the reference numeral 39 in Figure 6. The log 39 indicates a large peak to the right only at the level of a hard, impervious formation. It will be noted that the response produced by a caked permeable formation is about the same as the response produced by a shale.

Figure 5:
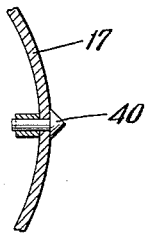
Figure 5 illustrates a modified form of contact member which is adapted to be used in a bore hole having a "mud cake" on the wall thereof.

The log for the run in which the rubbing member does cut through the "mud cake" may be obtained by substituting sharp cutters or scrapers for the button-shaped contacts 16a on the bow springs 17 in Figure 1. Figure 5 illustrates a cutting blade 40 fastened to the spring 17 which can be used for this purpose. The other springs 17 are similarly equipped.

Figure 6:
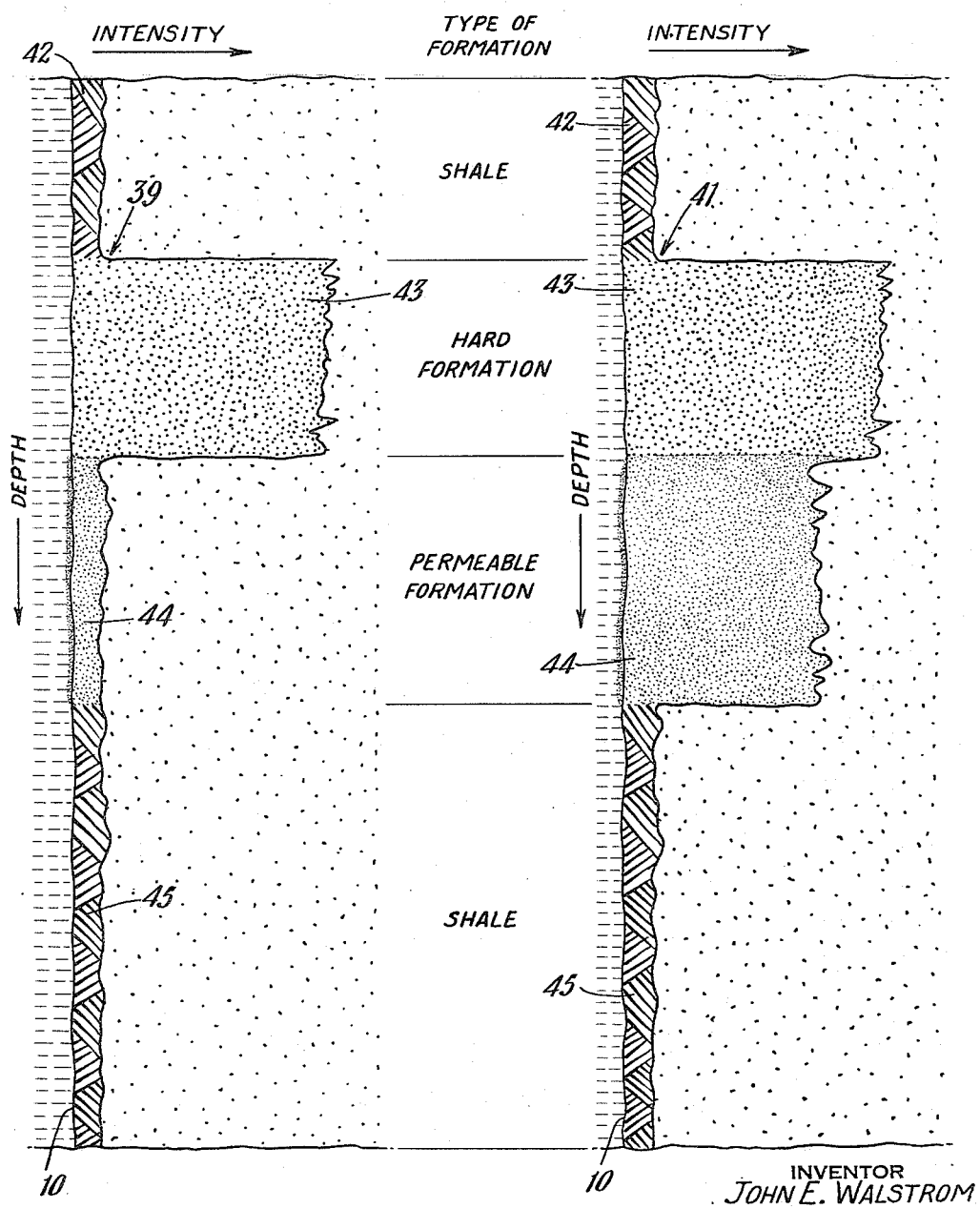
Figure 6 illustrates two representative logs, such as might be obtained with the apparatus shown in Figure 7.

A representative log obtained with the modified apparatus in the same bore hole in which the log 39 was taken is shown at 41 in Figure 6. The log 41 indicates a relatively large peak at the level of a hard formation and an adjoining peak of slightly lesser magnitude at the level of an adjacent, lower, peremable formation. The level of the permeable formation can be obtained by subtracting the curve 39 from the curve 41, and it corresponds to the part of the peak on the curve 41 which does not appear on the curve 39. Thus, by comparing these two separate runs made in a bore hole filled with drilling fluid, the hard impermeable strata, the permeable formations and the shales can be definitely located.

By making use of the dual apparatus shown in Figure 7, it is possible to obtain the two curves of Figure 6 in one trip into the bore hole. This apparatus consists of two spring assemblies, each employing a different type of contacting means, and each having a separate microphone, amplifier and recorder. Referring to Figure 7, the apparatus is shown in a bore hole 10 which traverses an upper shale formation 42 below which lie, in succession, a hard, impermeable formation 43, a permeable, sandy formation 44 and another shale 45. The bore hole contains a column of drilling mud 46 so that a shaley "mud cake" 47 has been formed between the drilling mud 46 and the permeable formation 44.

The apparatus comprises a microphone 48 disposed in a pressure tight case 49 mounted between upwardly and downwardly extending tubular members 50 and 51, respectively. A plurality of angularly spaced apart bow springs 52 are fastened at their upper and lower extremities to two collars 53 and 54, respectively, which are free to move longitudinally along the tubular members 50 and 51, respectively, within the restrictions imposed by fixed, spaced apart stops 55 and 56, respectively. Each of the angularly spaced apart springs 52 is equipped with a button-shaped contact 57, for engaging the wall of the hole 10. Located a fixed distance above the microphone 48 is a second microphone 58 which is also disposed in a pressure tight case 59 mounted between upwardly and downwardly extending tubular members 60 and 61. The upper tubular member 60 is secured to the supporting cable 62 and the lower tubular member 61 is secured to the tubular member 50 by a coupling member 63 made of sound insulating material.

Slidably mounted on the tubular members 60 and 61, respectively, are two collars 64 and 65 to which are secured a plurality of longitudinally extending bow springs 66, each of which is provided with a cutting member 67 intermediate its ends, for cutting through the "mud cake" on the wall of the bore hole 10. Stops 68 and 69 are also provided for limiting longitudinal movement of the collars 64 and 65, respectively. The microphone 58 is connected by the insulated conductors 70 and 71 in the supporting cable 62 to an amplifier 72 at the surface of the earth, the output of which is fed to a recorder 73. Similarly, the microphone 48 is connected by the insulated conductors 74 and 75 to an amplifier 76, the output of which is supplied to a recorder 77.

When the two spring assemblies are moved through the bore hole 10, the recorder 77 will provide a log like curve 39 in Figure 6 in which peaks correspond only to hard and impervious formations, while the recorder 73 will provide a log like the curve 41 in Figure 6 in which both permeable formations and hard, impervious formations appear as peaks. Since the two contacting members are located at different depths in the bore hole, it will be necessary to make a depth correction when comparing the records unless the depth correction is taken care of in the recording equipment.

Boundaries between dissimilar strata may also be denoted by providing either button-shaped or cutting contacts on both the bow springs 66 and 52 and connecting the outputs of amplifiers 72 and 76 to corresponding rectifiers 72' and 76', the outputs of which are connected in series opposition, the difference being recorded by a single recorder 78 as shown in Figure 8. With this apparatus, deflections will appear on the record only when the two rubbing members are adjacent dissimilar formations.

A more compact bore hole apparatus usable with the amplifying and recording equipment of Figure 7 for obtaining these curves is shown in Figure 9. In this embodiment, a plurality of longitudinally extending bow springs 79 and 80 are secured at their opposite ends to spaced apart collars 81 and 82 which are slidably mounted on a tubular support 83. The collars 81 and 82 may be of multiple unit construction and are preferably made of sound insulating material. Stop members 84 and 85 serve to limit the excursion of the assembly along the tubular support 83.

Mounted intermediate the ends of the bow spring 79 is a cutting contact 86, while the bow spring 80 is provided with a button-shaped contact 87. Secured to the bow springs 79 and 80 directly behind the contacts 86 and 87, respectively, are pressure tight casings 88 and 89, respectively, containing the microphones 90 and 91, respectively. The microphone 90 is connected to the conductors 70 and 71 in the supporting cable 62 and the microphone 91 is connected to the conductors 74 and 75, the rest of the recording circuit being as shown in Figure 7. Sufficient slack is provided in the wires connecting the microphones 90 and 91 to the conductors in the cable 62 to permit full operational movement of the bow springs 79 and 80 in all directions without breaking the circuits.

During operation, a log like the curve 39 in Figure 6 is obtained with the system comprising the button-shaped contact 87, the spring 80, the microphone 91, the conductors 74 and 75, the amplifier 76, and the recorder 77 (Fig. 7). Simultaneously, a log like the curve 41 in Figure 6 is obtained with a system comprising the cutter contact 86, the spring 79, the microphone 90, the conductors 70 and 71, the amplifier 72, and the recorder 73 (Fig. 7).

For convenience in utilizing commercially available equipment, instruments like the amplifier and recorder are shown at the surface; however, it is to be understood that by proper designing, it would be possible to incorporate part or all of this equipment with the bore hole apparatus to achieve the same results. For example, the recording may be done in the bore hole. By proper selection of the microphone and sound recorder, they may be directly connected, or the output of the microphone may be amplified and then recorded. Any necessary electrical energy may be sent down the electric cable from a source at the surface, or may be supplied from batteries associated with the bore hole equipment. In the latter case, the electrical cable may be dispensed with and the logging unit may be lowered on any cable or on a drill pipe. Also, the sound recording equipment may be disposed in the hole and part of the output of the microphone or amplifier sent to the surface for aural observation or recording. Time or other convenient signals may be added to make a suitable impression on the record. These signals are then used subsequently to assign depths to the record by methods well known in the art.

From the inherent nature of the apparatus, it is possible to use it in a cased hole for the purpose of locating casing joints or other anomalies, since a distinct impulse of noise will be heard when the apparatus is moved past such an irregularity in the casing.

It is evident that by stopping the apparatus in the hole, any noises existing therein due to movement of fluid to or from the formation or from other sources can be picked up by the microphone. By stopping at definite intervals throughout the bore hole, the location of the source of the noise can be determined. If the springs are removed, the necessity for stopping is eliminated and the source of sound can be located by a continuous procedure. Thus it may be employed to locate the producing strata in a flowing well or the levels where water flows into the well.

The specific embodiments disclosed are intended merely to be illustrative and not restrictive. The invention is not to be in any way limited thereby, but is susceptible of numerous changes in form and detail within the scope of the appended claims.

I claim:

1. Apparatus for investigating earth formations traversed by a bore hole, comprising, first wall engaging means adapted to be moved through the bore hole in engagement with the wall thereof and being relatively smooth where it engages said wall, second wall engaging means, movable with said first wall engaging means, and having a cutting edge where it engages the wall of the bore hole, vibration responsive means associated with each of said wall engaging means, and means for indicating the responses of said respective vibration responsive means.

2. Apparatus for investigating earth formations traversed by a bore hole, comprising, first wall engaging means adapted to be moved through the bore hole in engagement with the wall thereof and being relatively smooth where it engages said wall, second wall engaging means, movable with said first wall engaging means, and having a cutting edge where it engages the wall of the bore hole, vibration responsive means associated with each of said wall engaging means, means for transmitting mechanical vibrations from the respective wall engaging means to the vibration responsive means corresponding thereto, means for preventing any appreciable amount of mechanical vibration from one wall engaging means from influencing the vibration responsive means corresponding to the other wall engaging means, and means for indicating the responses of said respective vibration responsive means.

3. Apparatus for investigating earth formations traversed by a bore hole, comprising, two longitudinally spaced apart wall engaging means adapted to be moved through the bore hole in engagement with the wall thereof, mechanical vibration responsive means for each of said wall engaging means, and means for indicating the difference between the responses of said vibration responsive means.

4. A method of locating relatively permeable formations traversed by a bore hole drilled into the earth in which permeable and impermeable formations are present, a permeable formation being characterized by a mud cake deposited on the wall of the bore hole at said formation, comprising moving along the bore hole at substantially uniform speed a relatively blunt member that engages the impermeable formations traversed by the bore hole and the surface of the mud cake to produce first mechanical vibrations, moving along the bore hole at said substantially uniform speed a second relatively sharp member that engages the impermeable formations traversed by the bore hole and cuts through said mud cake to engage the permeable formation behind the mud cake to produce second mechanical vibrations, and obtaining indications of the first and second mechanical vibrations.

5. A method of locating relatively permeable formations traversed by a bore hole drilled into the earth in which permeable and impermeable formations are present, a permeable formation being characterized by a mud cake deposited on the wall of the bore hole at said formation, comprising simultaneously moving along the bore hole, at substantially uniform speed, a relatively blunt member that engages the impermeable formations traversed by the bore hole and the surface of the mud cake to produce first mechanical vibrations, and a second relatively sharp member that engages the impermeable formations traversed by the bore hole and cuts through said mud cake to engage the permeable formation behind the mud cake to produce second mechanical vibrations, and obtaining indications of the first and second mechanical vibrations.

6. A method of locating the permeable formations traversed by a bore hole drilled into the earth in which permeable and impermeable formations are present, comprising moving a blunt member along the bore hole in contact with the wall of a bore hole at a substantially constant speed, moving a relatively sharp member along the bore hole at said substantially constant speed in contact with the wall thereof, thereby producing first and second mechanical vibrations that are related to the materials comprising the wall of the bore hole, and obtaining indications of both of said mechanical vibrations.

JOHN E. WALSTROM.